Sheet 1 - 2 Sheets
P. Andrew.
Elevated Railroad,
No. 2,799. Reissued Nov. 19, 1867.
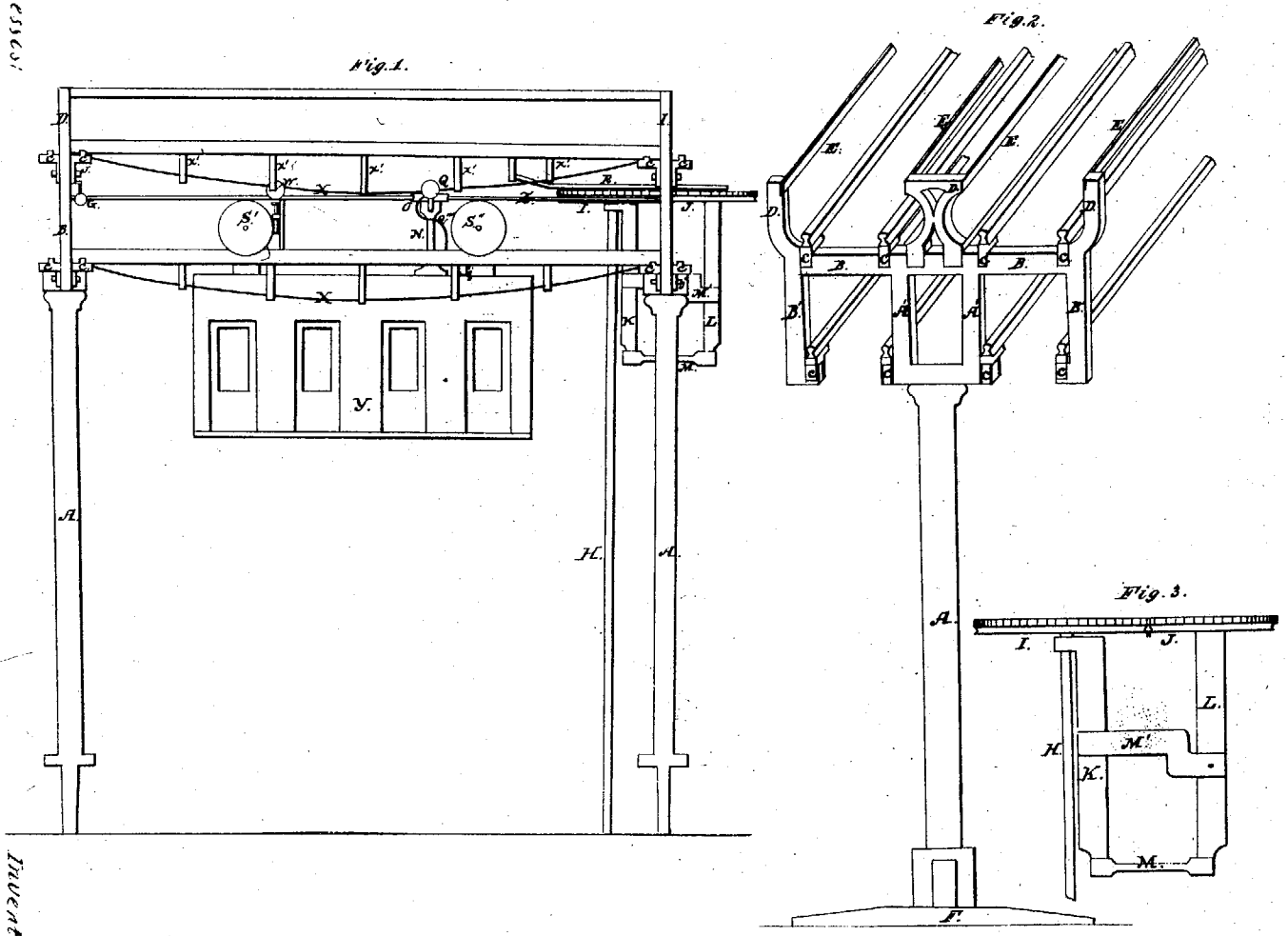
Witnesses:
C. G. Allen
C. G. Gale
Inventor:
Peter Andrew
Per his attorney C. G. Gale Sheet 2-2 Sh. A.
P. Andrew,
Elevated Railroad,
No. 2,799.
Reissued Nov. 19, 1867.
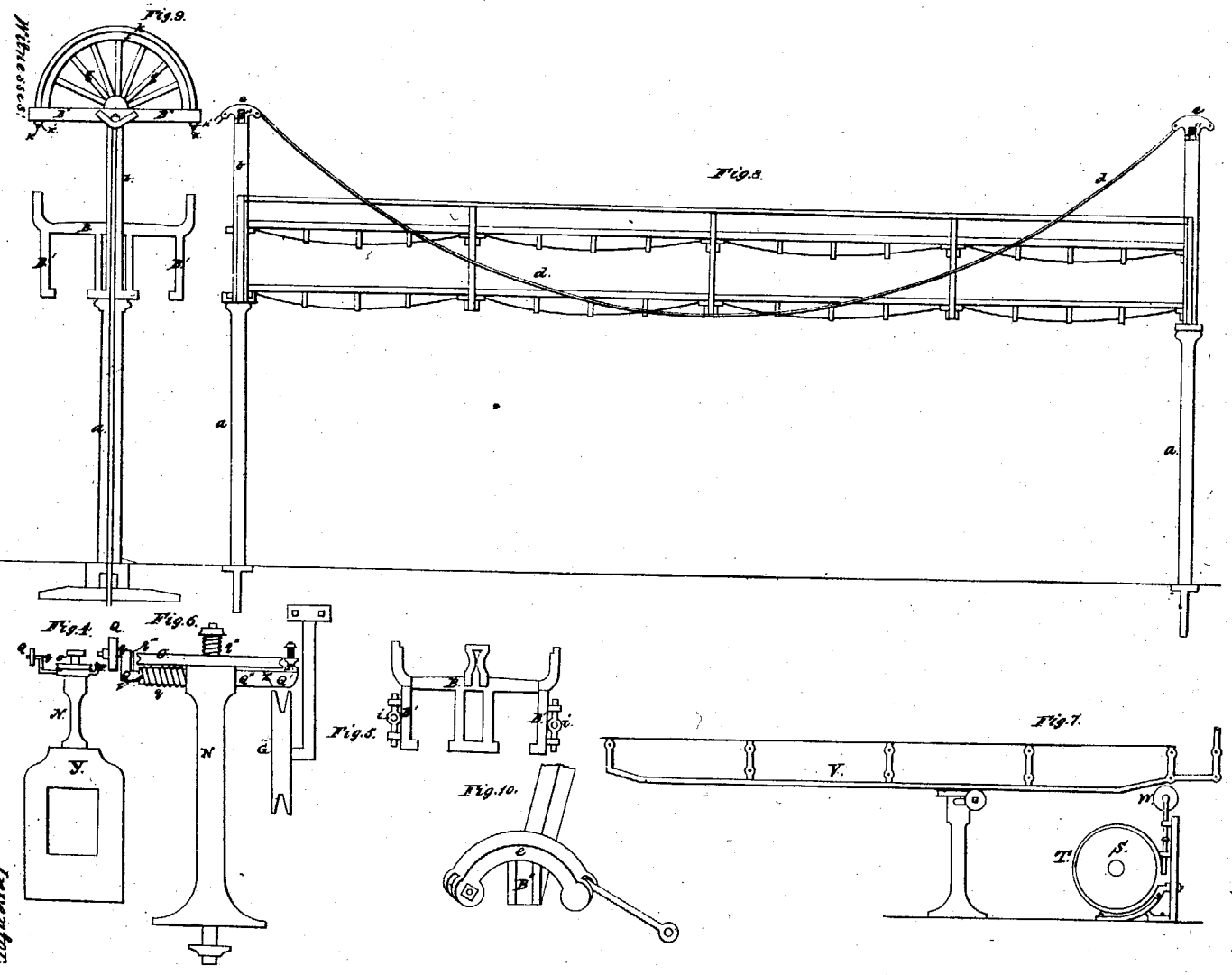
Witnesses:
E. J. Allen
C. G. Gale
Inventor:
Peter Andrew
Per his attorney C. G. Gale

UNITED STATES PATENT OFFICE.

PETER ANDREW, OF CINCINNATI, OHIO.

IMPROVEMENT IN ELEVATED RAILWAYS.

Specification forming part of Letters Patent No. 32,606, dated June 25, 1861; Reissue No. 2,799, dated November 19, 1867.

*To all whom it may concern:*

Be it known that I, PETER ANDREW, of the city of Cincinnati, county of Hamilton, and State of Ohio, have invented certain new and useful devices in the Construction of Elevated Railways; and I hereby declare that the following is a full and sufficient description thereof, reference being had to the accompanying drawings and reference marks thereon, making a part of the description.

The nature of the invention consists in an elevated quadruple-track railway, for city purposes, upon a single row of iron pillars planted firmly in bed-plates or foot-pieces of the same metal, and in propelling the cars by a succession of endless ropes, there being two tracks for cars on the same level, at a sufficient height above the street and sidewalk not to interfere with the travel, and two other tracks, also side by side, a little above the lower range of tracks. By this arrangement of the tracks, and by suspending the cars from the lower tracks, the tracks are brought near together and the cars to a convenient distance from the sidewalk.

In the drawings, Figure 1 represents a longitudinal elevation of a single reach of railway and car; Fig. 2, perspective of the quadruple track; Fig. 3, an elevation of a part of the propelling-gear; Fig. 4, an end view of the car and part of the propelling-gear; Fig. 5, a guide-pulley to be used for supporting the propelling-rope; Fig. 6, an enlarged view of a part of the details of Fig. 4; Fig. 7, the car-brake apparatus for stopping the car; Figs. 8, 9, and 10, a modification of the frame-work for sustaining the track in crossing streets, wherein Fig. 8 is a longitudinal elevation, Fig. 9 an end view, and Fig. 10 an end view, of the frame-work sustaining the track. Fig. 11 is a separate view of the chair.

Engines to operate the propelling machinery are placed in the cellars of the houses or under the sidewalk, and power is conveyed by H from the shaft of the engine to the propelling machinery shown in drawings, Fig. 1. One engine propels the ropes for two reaches, being placed at the point where one reach terminates and the other begins. At these points are placed the stations to receive and discharge passengers. The machinery is automatic, and the cars will stop at each station, unless the attendant at the station should control the machinery to cause the cars to proceed, the cars having sufficient impetus to carry them from one rope to the other. When the car reaches the station, wheel Q is depressed by bar R, and the rope is released and the brake apparatus is also put in operation by the depression of W, which causes the band to tighten on wheel S. The brake apparatus is controlled by the attendant at the station. By making the brake apparatus at the stations inoperative, the cars will proceed from one terminus of the road without stopping.

Supposing the cars to have arrived at the terminus of the road, and to be ready to return on the continuous track, which is on the same horizontal level, the car is to be transferred from one track to the other by means of a sliding table, well understood by engineers, and need not be described in this place.

In the drawings, let A A represent two of a row of columns on which the frame-work and cars are sustained.

A′ A′ are two other columns, erected on the top of the first one for sustaining the frame-work of the tracks.

B B′ represent other parts of the frame-work of the track.

C C, &c., represent the chairs or seats on which rest the several tracks.

D D′ are upright posts for sustaining the guides.

E E′ are guides for keeping the upper trains of cars on the track. The lower, being suspended, need no guides.

F F are bed-pieces for sustaining the pillars in a vertical position. Small pulleys G may be used for guiding the propelling-ropes.

I represents the pinion-wheel of driving-shaft H.

K is a lever geared with another lever, L, both used to control the propelling-rope on the pulleys.

J is a pinion geared with pinion I.

M is a rod geared with and operating levers K and L, to operate the propelling-rope and keep the same to the pulley.

M′ is the fulcrum-piece, acting on levers K and L.

N is an upright column extending from the top of the car, having on its upper end devices for gearing and ungearing with the propelling-rope.

O is the wheel, against the groove of which the rope plays, and is held in place by the bearing-piece P, which bearing-piece, as described below, performs the function of gearing and ungearing the cars with the propelling-rope.

Q represents a friction-pulley, which is received against the under side of bar R.

*q* is a crank operated by pulley Q.

Q′ is a shaft to which pulley Q and crank *q* are attached, it being at right angles with shaft H, or lying horizontally. The roller-piece P is also attached to the other end of the shaft (at right-hand end) and at right angles with the shaft.

Q″ is a sheath in which the shaft Q′ lies and oscillates, having a vibration through sixty to ninety degrees.

*q* is a crank.

Between Q, and *q′* is a spring to bring the shaft into position when the attachment to the rope is required.

*q″* is a spring for regulating the resistance of pulley O to the rope at the starting of the car.

*q″″* regulates the resistance of the roller P when acting against the rope.

*q‴* is a spiral spring for relieving band T from brake-wheel S after the car has passed bar R, arranged in the track frame-work at the end of the reach, and against the under side of which bar pulley Q acts for ungearing the rope. Each end of the bar inclines upward.

S is a brake-wheel for stopping the cars.

S′ and S″ are front and rear car-wheels.

*s* is the attaching part of friction-belt T to the bearing-block under the axle of wheel S′.

T is a steel friction-belt around the periphery of wheel S.

U is an operating-shaft for controlling band T.

W is a plain pulley-wheel on the top of said shaft.

X is a truss-rod.

X′ represents braces for sustaining the truss-rod.

*x* is a pinion shaft Q′.

*x′* is the oblique truncation of sheath Q″.

*a a* represent an extra reach of frame-support for the cars, showing how the cars described might cross a broad street, as shown hereinafter applied to the sidewalks of a street. The drawings of this modification introduce no new principle, but mere change of proportions, so that the same truss rods or ropes apply, but span a larger or smaller arch, with a longer or shorter reach.

*b* is an extra column placed upon the top of column *a*.

B″ B″ represent a cross-piece for sustaining arch *f*.

*d d* are wire truss-ropes to sustain the weight of the frame.

*e e* are saddles for sustaining the weight of the frame-work.

*f* is an arch, *g g* braces, *h* the outer band of the arch.

*k k′* are nuts and bolts for holding band *h* in place.

*i′ i′* are spurs on chairs *c c*.

*i″ i″* are legs or downward projections.

*i i* are bolts, through which wire ropes *d d* are passed.

*j j* are bolts for fastening chairs in place.

If we carefully examine Fig. 2, we find a perspective of an end view, showing four different tracks—two above, side by side, and two below, side by side.

The car, as seen in Fig. 1, is suspended below the track, while the two pairs of wheels S′ S″ rest upon the track. No cars are provided for the upper track, the arrangement being only for such as are now in use.

Supposing, now, the suspension-cars to be coming in on the left-hand track of the lower level, Fig. 2, and to have passed entirely out, on coming outside the cars run upon a sliding table so arranged on ways as to traverse from side to side between the space embraced by the two uprights B′ B′, by means of which the car is transferred from the left-hand to the right-hand track. Reversing the same movement the car is transferred from the right to the left hand track.

The sliding table and methods of operating it being well known, are not here described, the great object here being to economize street room over carriage-ways, and to bring the cars to a convenient position for foot-passengers on the sidewalk without incommoding stores and shops in the streets.

The cars are arranged to run directly over the curbstone—one-half over the paved carriage-way, the other over the outer edge of the sidewalk. The power is distributed among several stationary engines. One engine is adapted for operating two contiguous endless ropes. The cars are designed only for passengers, and may be made very light, carrying but two passengers abreast.

For this suspension railway a row of iron columns, A, is arranged upon the outer portion of the sidewalk, in range with the line of curbstones, resting upon iron sills or foot-pieces F, embedded in stone-work underneath the sidewalk. These foot-pieces extend out on each side, and thus brace and sustain the pillars in an upright position.

On the top of the columns A is mounted the iron frame-work to support the tracks, as seen in Figs. 1 and 2.

The frame-work consists of upright pieces A′ A′, sufficiently far apart to allow room for the tracks. Upon the top and across them rest the arms B′ B′, and on the inner side of the lower ends of these pendent pieces rest chairs C, upon which the rails are fastened. Like projections and for the same purpose are made at the bottom and outer sides of the pieces A′ A′, for the support of the inside rails of the lower tracks. The upper tracks rest upon the top of arms B B.

Upon all projections for the support of the lower rails, and upon the tops of the arms for the upper rails, are placed the chairs C, as seen in Fig. 11. The chair C is a flat piece of iron the width of the rail, the center of which rests upon the projection or arm. Across the upper portion of the chair, and extending from side to side thereof, is the spur $i'$, recessed in a corresponding slot in the under side of the rail, as seen in Fig. 1. On the lower part of the chair are two pending projections, $i''$ $i''$, embracing bearers B B and projections from B′ B′. The chairs are fastened to the bearers by bolts $j$ $j$.

Guide-rails E E are fastened to the curved uprights D D, which guide the cars and keep them from running off the track, as seen in Figs. 1 and 2. The rails between the chairs are sustained by the truss-rods X, screwed into the ends of the chair and braced by the rods or supports X′ at sufficient intervals for giving sufficient strength.

The cars Y are wide enough to seat two persons abreast, and are supplied with doors on the sides opposite the seats, thus reducing the car to the smallest width, and affording the greatest facility of egress and ingress, each seat being separate and independent of that before and that behind it. The cars are propelled by a succession of endless ropes Z, supported at intervals by guide-pulleys sustained on the frame. (Seen in Fig. 5.) The cars are suspended from the axles of S′ and S″ by interposed block-pieces, (not shown in the drawings,) and properly bolted thereto.

Between wheels S′, as seen in Fig. 1, is arranged brake-wheel S, as in Fig. 7. The same being made fast to the axle of the car, controls its motion as follows: Steel band T, being fast to the lower part of the block-piece lying between wheels S′, and immediately under S, by the interposed metallic attachments $f$, and connected at the upper end by means of shaft V to wheel W, by which the shaft and belt are operated by bearing-belt T against the periphery of S, and thus controls the motion of the car. Spiral spring $q''''$ surrounds shaft V, and is used to relieve band T from wheel S when pulley W has passed bar R. This brake can be operated by the conductor of the car or by a person at the station.

The gearing apparatus (seen in Figs. 1, 4, and 6) is supported on the top of column N. It consists of pulley-wheel O, roller P, friction-wheel Q, and shaft Q′, and sheath Q″. Besides these are crank $q$ of the shaft and spiral spring $q''$, bearing upon the side of wheel O, to prevent it from turning when the car has attained to the speed of the rope. The spring $q'$ controls the reciprocal rotation of shaft Q′.

Letter $x$ represents a pin in shaft Q′, and $x'$ the oblique truncation of the end of Q″, which give an outward motion to the shaft Q′.

Now, keeping the eye on Fig. 6, it is seen that wheel Q or crank $q$, being depressed by bar R to give a partial rotation to the shaft Q′, and at the same time an outward movement of said shaft, releases the bearing of roller P, acting against the rope, and causes roller P at the same time to pass under wheels I J, which releases the car from the action of the rope. The wheel Q continues depressed by the action of bar R until roller P has passed beyond the rope-propelling wheels I and J. Bar R, having an upward inclination at the end, permits wheel Q to gradually rise and the crank $q$ (upon the end of which the wheel Q turns) to attain an upright position through the operation of spring $q'$, when the roller P again firmly presses the rope against the wheel O. The wheel O and roller P are prevented from turning except from a given resistance, which is regulated by springs $q''$ and $q'''$.

It is found that as considerable strain comes on rope Z in long reaches, and especially when heavy loads are put upon the cars, the driving-pulley I has a tendency to be drawn away from pulley J. To obviate this tendency the leverage shown in Fig. 3 has been devised.

K and L are levers, in connection with fulcrum-piece M′, causing the wheels I and J to be drawn together in proportion to the resistance of the weight drawn.

What I claim as my invention, and desire to secure by Letters Patent, is—

1. The construction and arrangement of a quadruple track upon a single row of pillars provided with cross-arms for suspending and supporting the tracks, substantially as set forth.

2. The arrangement of the guide-rails E E to obviate the necessity of using flanges on the car-wheels, and to prevent the cars being thrown from the track, in the manner and for the purpose herein set forth.

3. The arrangement and combination of bars K and L, fulcrum-piece M′, connecting-rod M, for holding propelling-rope firmly against groove of wheel.

4. A succession of endless ropes for propelling street-cars.

5. The combination gear apparatus O P Q Q′ Q″, as described, for attaching and detaching cars from the propelling-ropes.

6. The arrangement and combination of wheel S and band T, as described, and for the purposes set forth.

7. Supporting the rails of the track by means of truss-rods X, substantially as set forth; but I do not claim the truss-rods except as a support for the rails of an elevated railway.

P. ANDREW.

Witnesses:
ROBERT CURRENT,
L. D. GALE.